(12) United States Patent
Burke

(10) Patent No.: US 6,309,266 B1
(45) Date of Patent: Oct. 30, 2001

(54) SHIP PROPULSION AND STEERING SYSTEMS

(76) Inventor: Peter G. Burke, 59 Maryland St., New Orleans, LA (US) 70124

( * ) Notice: Subject to any disclaimer, the term of this patent is extended or adjusted under 35 U.S.C. 154(b) by 0 days.

(21) Appl. No.: 09/468,761

(22) Filed: Dec. 21, 1999

(51) Int. Cl.[7] ................................................. B63H 5/14
(52) U.S. Cl. .............................. 440/68; 114/148; 114/151
(58) Field of Search .................................. 440/68, 69, 46, 440/40, 38; 114/148, 151

(56) References Cited

U.S. PATENT DOCUMENTS

| | | |
|---|---|---|
| 14,589 | 4/1856 | Arnold . |
| 815,270 | 3/1906 | Davids . |
| 917,201 | 4/1909 | Vollmer . |
| 1,023,515 * | 4/1912 | Graves .................................. 440/38 |
| 1,161,453 | 11/1915 | Court . |
| 2,114,112 | 4/1938 | Norquist . |
| 2,270,690 * | 1/1942 | Shannahan ............................ 440/40 |
| 2,404,528 | 7/1946 | Rankin et al. . |
| 2,467,022 * | 4/1949 | Forlano ................................. 440/40 |
| 3,127,865 * | 4/1964 | Pleuger ................................. 114/151 |
| 3,412,705 * | 11/1968 | Nesson .................................. 440/40 |
| 3,438,350 * | 4/1969 | Gallin ................................... 440/69 |
| 3,625,176 * | 12/1971 | Moellering ............................ 440/40 |
| 4,767,364 | 8/1988 | Lenz . |
| 5,687,670 | 11/1997 | Rice . |

FOREIGN PATENT DOCUMENTS 61-229694 * 10/1986 (JP) ........................................ 440/68

* cited by examiner

*Primary Examiner*—Sherman Basinger
(74) *Attorney, Agent, or Firm*—Shawn D. Sentilles

(57) ABSTRACT

A propulsion and steering system for reducing water mounding along and under a bow and hull of a mono-hull ship thereby enhancing displacement of water by the hull and permitting increase of the beam to length ratio of the ship comprising two or more thrust chambers, each of the thrust chambers passing lengthwise through the hull below a waterline of the ship, each of the thrust chambers having an open bow end and an open stern end, and a bow of the ship configured to channel water into the bow ends of the thrust chambers. Preferred configurations of the bow are disclosed. A propeller or turbine thruster is preferably positioned in each of the thrust chambers for propelling water through the thrust chamber. Each of the thrust chambers preferably has one or more outlet ports passing through an outer wall thereof, the outlet ports positioned aft and adjacent the propeller or turbine thruster, and a gate pivotally secured in the thrust chamber aft and adjacent the outlet ports such that the gate can be pivoted to permit selective channeling of propelled water through the outlet ports to thereby contribute to steering and maneuvering the ship. The gate may be sized and configured to substantially seal the thrust chamber.

17 Claims, 5 Drawing Sheets

SHIP PROPULSION AND STEERING SYSTEMS

FIELD OF THE INVENTION

The present invention relates to ship propulsion and steering systems, and more particularly to a ship propulsion and steering system for reducing water mounding along and under a bow and hull of a mono-hull ship, thereby enhancing displacement of water by the hull and permitting increase of the beam to length ratio of a ship.

BACKGROUND OF THE INVENTION

Conventional large ships are generally monohull, with the single hull consisting basically of a bow or forward section, a main or midships section, and a rear or stern section. Propulsion is generally by one or more propellers situated behind or under the stern section, turned by shafts rotated by engines conveniently situated at the bottom of the ship, usually near the stern section in cargo ships and towards midships in passenger and other ships. Steerage is accomplished by one or more large rudders situated behind the propellers, with incorporation in some ships of thrust chambers containing propellers or pumps situated across the beam in the forward and/or aft sections of a ship, and powered by separate motors or engines, for maneuvering the ship in harbors and other restricted areas. The forces involved in propelling and steering many large conventional ships do not permit gears for the reversal of the rotation of propeller shafts and/or require a lengthy period of time to accomplish reversal of rotation by gears or reversal of engine rotation. Without bow and/or stern thrusters, reliance by conventional ships on rudders and engine controls may become hazardous under certain circumstances (i.e., a ship proceeding downstream during periods of swift currents when there are speed and maneuvering restrictions in river ports and other restricted areas).

The bow sections of conventional ships are generally in the form of a wedge which divides the water as equally as possible along a central line of the bow to displace the water down and along the sides. In doing so, displaced water is added to other water forward of the bows, creating a mound, or "hill", requiring additional energy to surmount. The mound of water basically remains at the bow until the excess water travels away from the ship in the form of waves, or "wakes." Increasing the speed of a conventional ship increases the volume of water displaced by the bows in a given period of time which increases mounding, and also has the effect of reducing the volume of water at the midsections of the ship, with a resulting mounding of water along the rear portions of the midsections and at the stern. Due to the need to reduce friction on the bows and the area of forward mounded water, conventional ships are generally constructed with a smaller beam to length ratio, with constraints on length resulting from torsion and other forces on structural materials requiring deeper drafts of hulls to increase cargo and other capacities.

The limitations imposed by the water displacement process of conventional ships, requiring increasing factors of power for smaller increments of increased speed, and/or requiring reductions of speed to conserve fuel or lessen hazards by its wakes to other ships and marine equipment, shores and shore installations, has resulted in a number of concepts and designs. To minimize displacement of water at increased speed, marine craft have been designed for many years to lift a hull higher in the water, and more recent power sources have permitted hulls to have minimum displacement by "planing" and/or use of entrapped forced air to lift the hull above the water (i.e., hovercraft). Power and construction requirements limit the size and/or carrying capacity of such marine craft.

Other designs use multihulls, with two or more long narrow hulls reducing the displacement of water, again increasing speed but with diminished load capacities. More recently there has been the concept of a monohull fast ship by producing a high pressure area at the bottom portion of the stern. U.S. Pat. No. 5,832,856 (Giles).

Many years ago there were concepts for modifications of the designs of ships by incorporating one or more tubes from bows to stern with propellers situated both within and outside of the forward and rear ends of the tubes. U.S. Pat. Nos. 14,589 (Arnold); 815,270 (Davids); 1,161,453 (Court). While those earlier concepts had merit, they were based on then existing technologies, materials and ship designs, without systematic development of an integrated ship propulsion and steerage design, requiring total evolution of concepts and design of ships to maximize the benefits of reduction of the energy necessary to displace water and use of the energy of the displaced water in the propulsion and steerage of a ship. In addition, the development of turbine thrusters or "pumps" significantly enhance the propulsion of water when contained and operated in thrust chambers, compared to enhanced conventional propellers.

There is thus a need for a ship propulsion and steering system for reducing water mounding along and under a bow and hull of a mono-hull ship, thereby enhancing displacement of water by the hull permitting increase of the beam to length ratio of a ship and enhancing the steering maneuvering of a ship, according to the following objectives and description.

OBJECTS AND SUMMARY OF THE INVENTION

1. In order to reduce the energy necessary to displace water from the bows of a large ship, and to use the energy of the displaced water in the propulsion and steerage thereof, a basic objective of the present invention is to configure the bows to channel water forward thereof into two or more tubes or chambers situated on the bottom, outer sides of a ship having a greater beam to length ratio compared to conventional ships, propelling the displaced water by means of propellers or turbine thrusters within the chambers to flow the water from the forward or bow ends of the tubes or chambers through those chambers to the stern section, where additional propellers or turbine thrusters would propel the water from the stern of the ship for propulsion thereof, and steerage by variation of the rotation and/or the angle of the blades of the propellers or turbine thrusters.

2. Another objective is to reduce the friction of water on the outer sides of a ship by incorporation of the aforesaid propulsion system in a ship to permit a greater beam to length ratio compared to conventional large ships.

3. Another objective is to permit greater stability of a large ship and the security of its cargoes by use of a wider beam resulting from the use of the aforesaid propulsion system.

4. Another objective is to reduce the length of a ship, and to minimize the reduction of water supporting the midsections of a ship, in order to minimize the torsion and other forces induced on conventional ship structures due to reduced water support and length thereof, and to reduce the mounding of water forward of the bows and along the rear of the midsections and stern experienced by conventional ships.

5. Another objective is to utilize the strength necessary for the chambers channeling propelled water within the bottom, outer sides of a ship, to provide the basic internal support structures, or "keels", of a ship.

6. Another objective is to provide electrical and/or hydraulically powered motors situated in the vicinity of the propellers or turbine thrusters in the chambers, which motors would be powered by a conveniently situated engine or engines with electrical generators and/or hydraulic pumping systems, and which could provide braking force on the propeller shafts and could be rapidly reversed in direction to reverse the rotation of propellers or turbine thrusters.

7. Another objective is to permit incorporation of engines and related propulsion equipment, as well as other equipment, navigation and crew quarters and other facilities, at convenient locations in a cargo or other ships, and in particular to allow unhindered movement of cargo to and from the midsections of the ship and/or over and through the stern portions thereof.

8. Another objective is to permit design and construction of the bows of a large ship to channel water into the tubes or chambers in the most beneficial manner, reducing the friction and other hydrostatic forces affecting conventional ships, while also using that water to cushion the effect of waves and to provide lifting forces on the bows when encountering waves, both within a wave and in the valley between waves.

9. Another objective is to reduce wakes created by a conventional ship when displacing water, which represent wasted energy and are hazardous to other ships and marine craft and to shores and installations thereon.

10. Another objective is to provided gates within the forward and rear portions of the thrust/propulsion chambers to manifolds or outlet ports in the outer portions of the chambers and direct the propelled displaced water from the chambers through the outlet ports in a controlled manner and perpendicular to the sides of the ship to provide additional steerage of the ship and lateral movements and other maneuvering of the ship.

11. Another objective is to reduce water friction and weight on the stern section of a ship by avoiding the necessity of a rudder, steering the ship by means of the propellers or turbine thrusters situated in the chambers along the bottom sides of a ship of wider beam, and/or by the water propelled from the sides of the ship though manifolds/outlet ports in the tubes or chambers.

12. Another objective is to incorporate electronic systems to control the propulsion, steering and maneuvering systems of the ship by a single person at various convenient locations on the ship, with each of the propeller motors controlled in speed, direction (forward and reverse) and/or angle of blades of the propellers, and each of the side thruster gates controlled as to volumes of water exiting through the manifolds/outlet ports, to provide lateral movements of the ship and maximum control of all movements of the ship.

13. Another objective is to permit closure of gates in the tubes or chambers for the purpose of evacuation of water during inspection, maintenance and repair of the ship and propellers, and/or to provide buoyancy for the vessel and partial double-hull protection of the sides and bottom of a ship.

14. Another objective is to permit design and construction of the stern section to permit maximum thrust of displaced water through fixed structures of the stern and/or to install gates or other equipment to control that thrust.

15. Another objective is to incorporate equipment and/or substances for the generation of electrical and/or hydraulic power for powering propeller motors in the event of failure of the main engine or engines.

In order to achieve the aforesaid objectives, the present invention is characterized as a ship propulsion and steering system comprising a monohull having bows or a forward section designed and constructed to channel all or most of the water forward of the bows in the most beneficial manner into two or more tubes or chambers situated within the bottom, outer sides (below water lines) of the ship where propellers or turbine thrusters situated within the forward parts of the chambers propel the water aft through the chambers to the stern section of the ship where other propellers or turbine thrusters propel the water from the ship. By reducing the mounding of water forward of the bows and the friction and other hydrostatic effects of water on the bows, this embodiment permits the design and construction of a ship with a greater beam to length ratio compared to conventional large ship of the same or lesser displacement, having the beneficial effects of reducing friction of water on the sides of the ship, reducing torsion and other effects affecting longer conventional ships with bows and stern sections lifted by mounds of water and with reduced midships water support, and providing enhanced stability of the ship and security of cargoes.

The propulsion chamber systems would be constructed of sufficient strength to contain and channel the displaced water, which would also provide the basic internal support structures ("double keels") of the ship. The propellers or turbine thrusters would be located within the chambers to provide the most beneficial movements of displaced water, forward or aft, rotated by electrical or hydraulic motors situated in the vicinity of the propellers, which could be controlled to brake the rotation of the shafts, propellers or turbine thrusts and to be rapidly reversed to reverse the rotation of propellers, or turbine thrusters, and/or the angle of the blades of propellers could be changed to maximize their thrust of water, both forward and aft. The motors would be powered, electrically or hydraulically, by an engine or engines conveniently located in the ship with related electrical generating and/or hydraulic pumping equipment, and, in particular, allowing location of engines and related equipment, navigation and crew quarters, and other ship facilities in the forward part of a cargo ship, allowing unhindered movements of cargoes to and from midsections of the ship and/or through and over the stern portions thereof. By channeling forward water through the chambers and propelling those waters through the stern sections, the energy of the displaced water may be utilized in propulsion of the ship, while reducing the quantity, size and speed of wakes which are hazardous to other ships and marine craft, shores and shore installations.

In this embodiment, the propulsion system would achieve the first nine objectives (1–9) stated above.

The first embodiment would permit location of gates within the thrust chambers, to the rear of the forward propellers or turbine thrusters and to the rear or forward of the stern propellers or turbine thrusters, which gates may be rotated to reveal or expose outlet ports or manifolds in the outer sides of the thrust chambers and to divert a desired flow of the propelled water through those outlet ports perpendicular to the sides of a ship to provide lateral forces for the purposes of steerage of a ship and maneuvering thereof. Together with variation of rotation and/or the angle of the blades of the thrust propellers or turbine thrusters, both forward and reverse, this embodiment would avoid the need of a rudder, and achieve the tenth and eleventh objectives (10 and 11) stated above.

The above embodiments would permit the electronic control of the aforesaid propulsion and steerage systems by one person using electronic control devises which may be physically connected to the electronic system at various locations and/or connected by radio, infrared, and other transmissions of control signals to that electronic system. This embodiment would achieve the twelfth objective (12) stated above.

The above embodiments would permit the construction of the aforesaid gates in the thrust chambers to allow those to close against the sides of and seal the thrust chambers, permitting the evacuation of water from the portions of the chambers between the gates, for the purposes of inspection, maintenance and repair of the chambers, providing additional buoyancy for the ship as necessary, and providing partial double hull integrity for the ship. Additional gates could be incorporated forward of the forward propellers or turbine thrusters and aft or forward of the stern propellers or turbine thrusters, to permit evacuation of water from the area of the propellers or turbine thrusters to permit inspection, maintenance and repair thereof. This embodiment would achieve the thirteenth objective (13) stated above.

To increase the trust of waters propelled from the stern of a ship, gates could be incorporated in the stern sections to vary the direction of flow of the water, to achieve the fourteenth objective (14) stated above.

Additional electrical generator and hydraulic pumping equipment, and/or other forms of electrical generating substances and equipment, could be incorporated in the ship to provide a minimum power source for the propulsion motors and other equipment in the event of failure of the main engine systems, achieving the fifteenth objective (15) stated above.

DETAILED DESCRIPTION OF PREFERRED EMBODIMENTS

Figure 1:
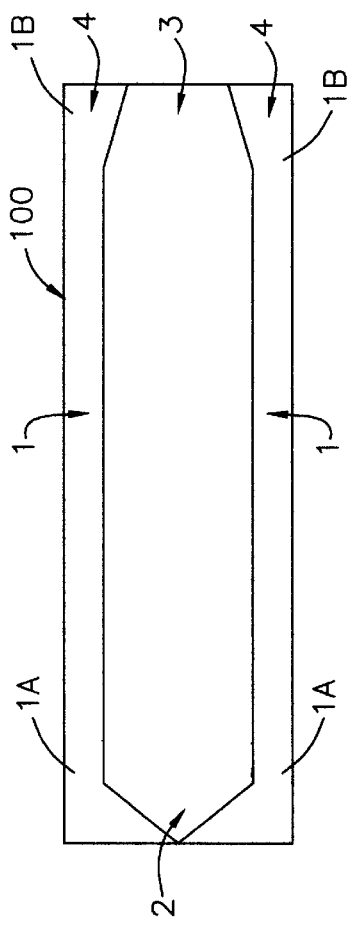
FIG. 1 is a cross-sectional top view of the bottom of a ship according to the invention showing the basic configuration of one embodiment of the thrust chambers.

The preferred embodiments of the invention will now be described with reference to the accompanying drawings. The embodiments stated in this description and shown in the drawings are representative of a particular cargo ship to exemplify the incorporation of the propulsion and steerage systems described, each of which may be modified in various ways for incorporation in a preferred manner in ships and marine craft, without intention to limit in the description and drawings the scope of the concepts inherent in the invention.

As shown in FIGS. 1–7, the invention is a propulsion and steering system for reducing water mounding along and under a bow 2 and hull 110 of a mono-hull ship 100, thereby enhancing displacement of water by the hull 110 and permitting increase of the beam to length ratio of the ship 100. As shown in FIG. 1, the propulsion and steering system of the invention consists generally of two or more thrust chambers 1, each of the thrust chambers 1 passing lengthwise through the outer hull below a waterline of the ship 100, and each of the thrust chambers 1 having an open bow end 1A and an open stern end 1B. The bow 2 of the ship 100 is configured to channel water into the bow ends 1A of the thrust chambers 1. For a particular ship, four or more thrust chambers 1, larger or smaller, may be incorporated, forming the sides of a ship 100 from bottom to waterline 5, which under circumstances may form a double hull or protective hull. In a preferred embodiment, at least one propulsion means 15,23 (see FIGS. 3–4) is positioned in each of the thrust chambers 1 for propelling water through the thrust chamber 1. One propulsion means 15 is preferably positioned adjacent the bow end 1A of the thrust chamber 1, and a second propulsion means 23 is preferably positioned adjacent a stern 1B end of the thrust chamber 1. In other embodiments, at least one propulsion means, such as 130, is positioned in the thrust chamber 1 between the bow propulsion means 15 and the stern propulsion means 23. The propulsion means 15, 23, 130 may preferably be selectively reversed to assist in maneuvering and steering the ship 100.

FIG. 1 is a cross-sectional top view of a bottom of a ship 100 showing the basic configuration of thrust chambers 1 within the bottom, outer sides of a ship 100. The thrust bows 2 in the forward chamber are configured to divide and channel water into the forward portions, or bow ends, 1A of the thrust chambers 1. Propellers or turbine thrusters 15 in the forward parts of the thrust chambers (not shown in FIG. 1; see FIG. 3) force the water towards the stern 3 where the water is further propelled by propellers 23 (not shown in FIG. 1; see FIG. 4) in the stern section 3 through the stern thrust chambers 4. The thrust chambers 1 may be configured for a particular application, or gates may be incorporated to vary the thrust of the propelled water, as will be described in further detail below.

Figure 2:
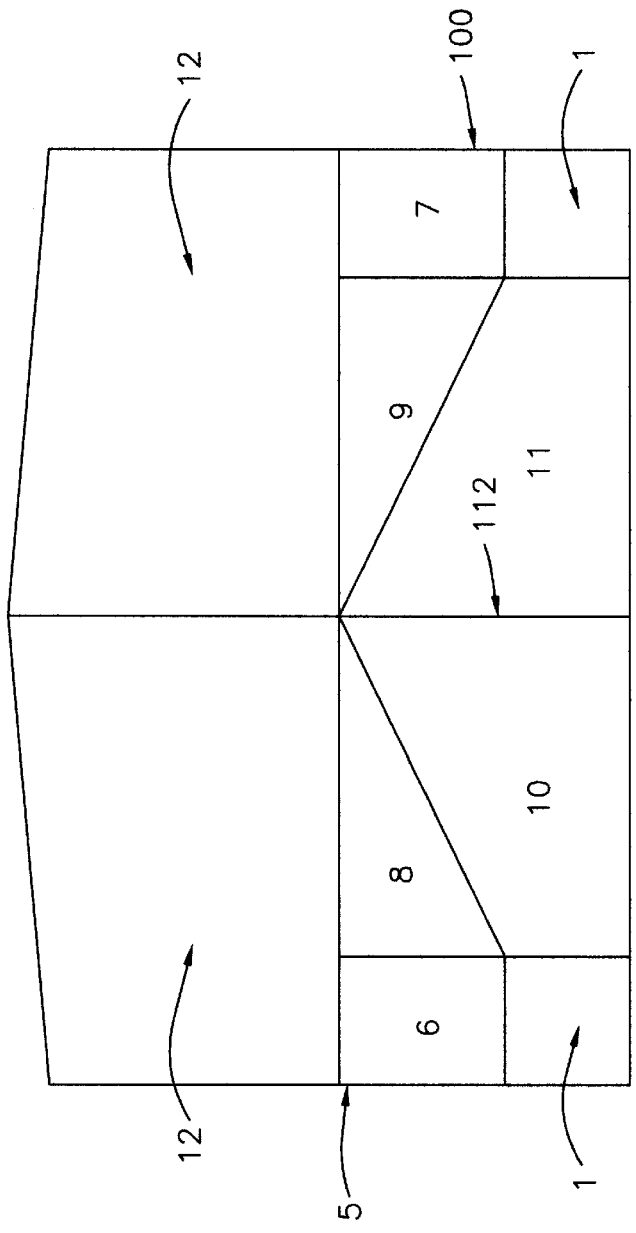
FIG. 2 is a front view of one embodiment of the thrust bows of a ship according to the invention.

FIG. 2 is a front view of the thrust bows of a ship 100 configured below the water line 5 with plates 6–11 forming "thrust bows" to channel water into the forward parts 1A of two thrust chambers 1. As shown in FIG. 2, in a preferred embodiment, the configuration of the bow 2 includes, on either is side of a central line 112 of the hull 110, a substantially rectangular plate 6, 7 depending downward below the waterline 5, a lower end of the rectangular plate 6, 7 positioned substantially above a bow end 1A of one of the thrust chambers 1; a substantially triangular plate 8, 9 depending downward below the waterline 5, an edge of the triangular plate 8, 9 positioned substantially along the waterline 5, a second edge of the triangular plate 8, 9 contiguous with a keel-ward edge of the rectangular plate 6, 7; and a keel plate 10, 11, the keel plate 10, 11 being contiguous with (a) the central line 112 of the hull 110, (b) a third edge of the triangular plate, and (c) a keel-ward edge of the thrust chamber. The rectangular plate 6, 7, the triangular plate 8, 9, and the keel plate 10, 11 are together angled to direct water from the bow 2 into the bow end 1A of the thrust chamber 1.

Figure 6:
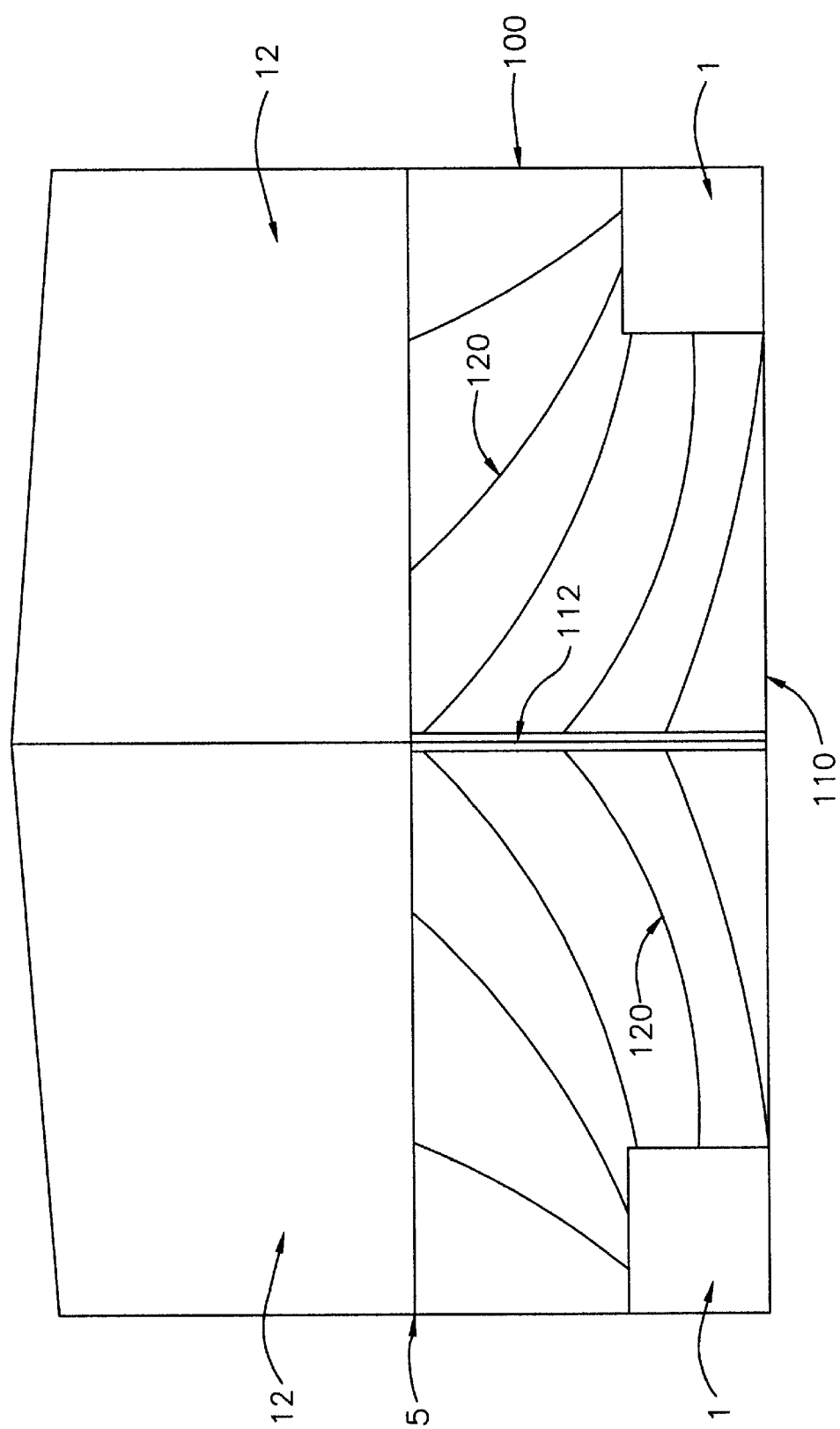
FIG. 6 is a front view of one embodiment of the thrust bows having curved plates according to the invention.

In lieu of flat plates, the forward thrust bows 2 may be curved, as shown in FIG. 6 with representative curved lines 120 of the bow, to provide maximum effective channeling of water into the thrust chambers 1 of a particular ship. In the configuration of FIG. 2, the flat plates may be designed and constructed for the particular ship 100 with the plates angled, with top end forward and bottom end aft, to provide more cushioning and lifting (vertical) force on the bow section when encountering waves, with excess wave water thrust forward to cushion and lift the bows 2 in the valleys between waves. Also in this embodiment, the thrust chambers 1 are shown as square, which may be modified to round the thrust chambers, in whole or part. The bow sections 12 above the waterline 5 are shown in a configuration designed to divide forward water, primarily waves, to thrust that water away from the bows and sides of a ship 100, rather than down and along the bows and sides of a conventional ship.

Figure 3:
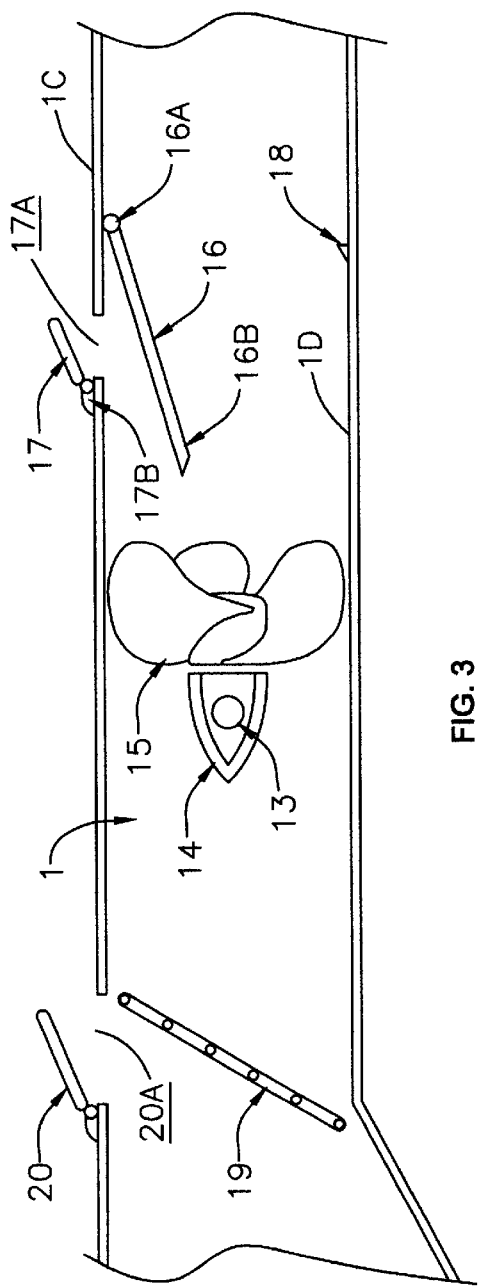
FIG. 3 is a cross-sectional top view of one embodiment of a bow or forward propulsion and steerage system according to the invention.
Figure 4:
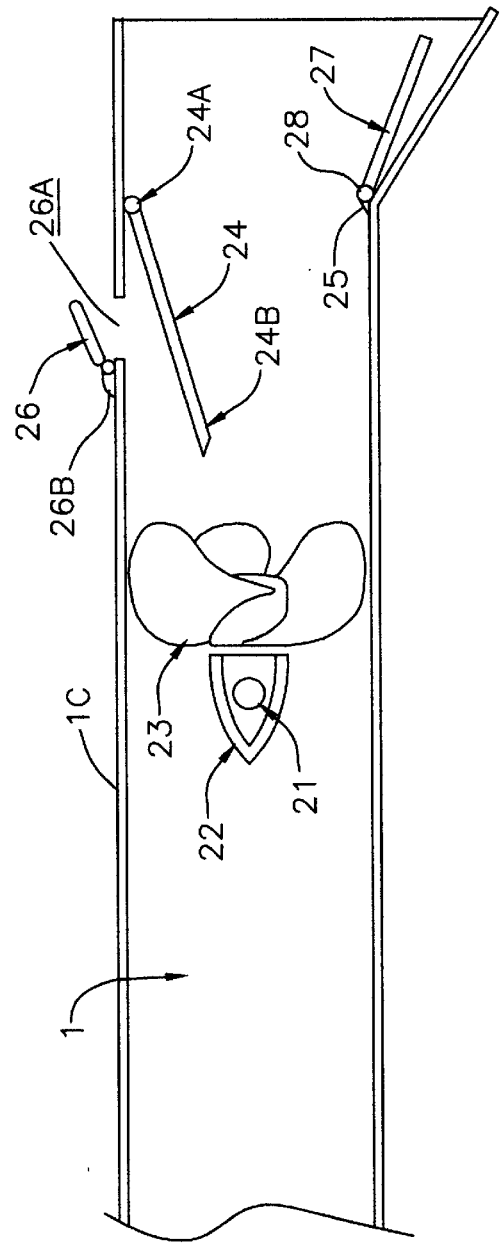
FIG. 4 is a cross-sectional top view one embodiment of a stern propulsion and steerage system according to the invention.
Figure 7:
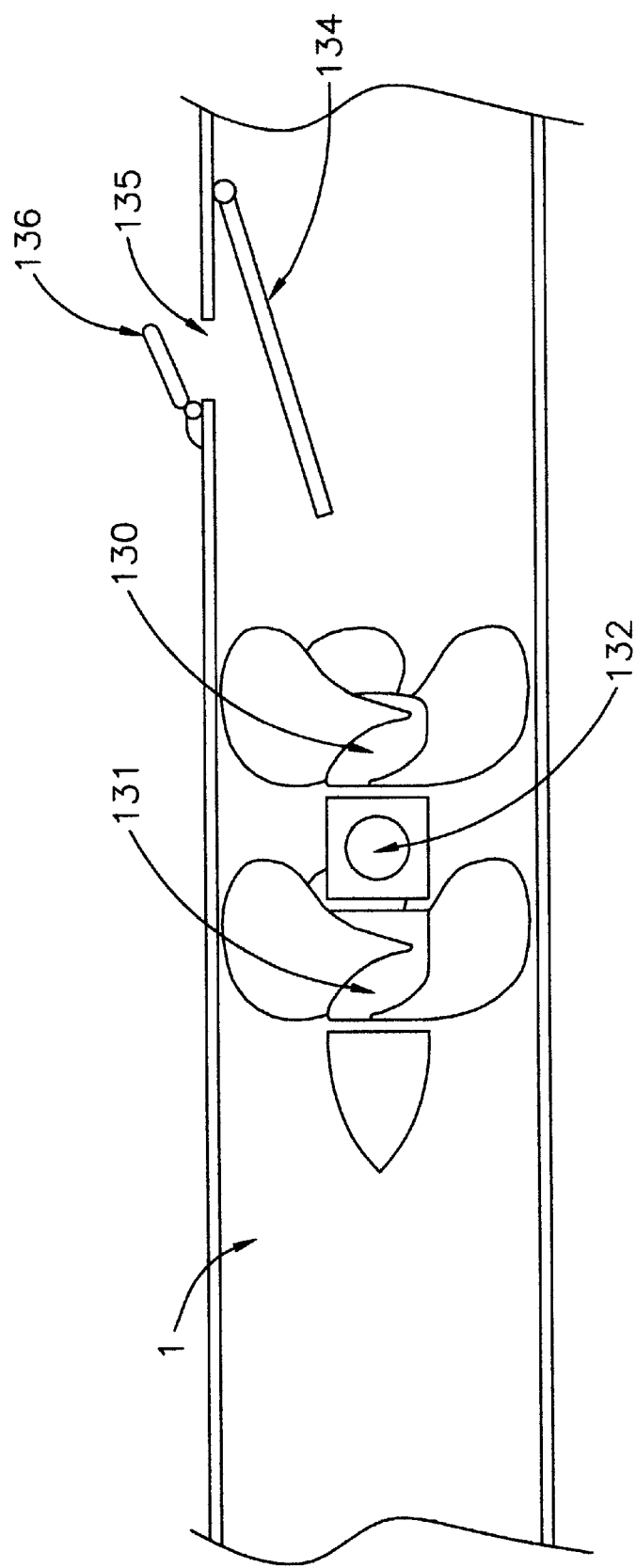
FIG. 7 is a partial cross-sectional top view of one embodiment of a midships dual propulsion and steerage system according to the invention.

FIGS. 3–4 show top views of forward and stern portions, respectively, of a starboard thrust chamber 1 with the top side removed to show preferred embodiments of the propulsion means. In a preferred embodiment, the propulsion means comprises a water-tight compartment 40 (see FIG. 5) positioned above the thrust chamber 1, an electric or hydraulic motor 29 (see FIG. 5) positioned in the water-tight compartment 40, a drive shaft 13, 21 of the motor extending downward into the thrust chamber 1 and into a gear unit 14, 22 to change the rotation of the drive shaft 13, 21 (e.g. from vertical to horizontal), and a propeller or turbine thruster 15,23 rotatably mounted on the drive shaft 13, 21 via the gear unit 13, 21 to thereby propel water through the thrust chamber 1. In the embodiment shown in FIG. 7, a second propeller or turbine thruster 130 is rotatably mounted on the lower end of the drive shaft 132 via the gear unit 132, in a manner well known to those of ordinary skill in the art, to thereby assist the first propeller or turbine thruster 130 in propelling water through the thrust chamber 1. The propellers 15, 23, 130, 131 may be replaced by more efficient turbine thrusters to reduce cavitation and increase the thrust of propelled water. Additional propulsion units may also be incorporated midships, as shown in FIG. 7, as desired for a particular ship, with or without similar side thruster gates 134 and manifolds 135 with side hull flap covers 136.

The force of propelled water through the opened manifolds 17A, 26A, 135 provides lateral thrust to the ship 100 for steerage and for lateral maneuvering thereof. When proceeding in reverse, maneuvering may be accomplished by selectively varying the rotation and/or the angle of the blades of one or more of the propellers 15, 23, 130, 131. Additional manifolds and gates may be incorporated to provide lateral thrust though similar manifolds for maneuvering a particular ship when reverse movements are frequently expected.

FIG. 3 is a top view of the forward part of a starboard thrust chamber 1 with the top side removed. In the forward part of the chamber is a propulsion means. In a preferred embodiment, the propulsion means comprises a vertical shaft 13, support strut and gear box 14, and a single propeller 15 rotated by an electric or hydraulic motor (not shown in FIG. 3; see FIG. 5, component 29) situated in a water tight compartment 40 (see FIG. 5) over the shaft 13 and top side of the thrust chamber 1. To the rear, or aft, of the propeller 15 is a gate 16, hinged to the inside of the thrust chamber and turned by an electric or hydraulic motor (not shown in FIG. 3; see FIG. 5, component 34) situated in a water tight compartment 40 over the shaft 16A of the gate. Each of the thrust chambers 1 preferably has one or more outlet ports 17A, 26A passing through an outer wall 1C thereof. The outlet ports 17A, 26A are positioned aft and adjacent the propulsion means 23. A gate 16, 24 is pivotally secured in the thrust chamber 1 aft and adjacent the outlet ports 17A, 26A. An electro-mechanical pivot means 16A, 24A is provided for pivoting the gate to thereby permit selective channeling of propelled water through the outlet ports 17A, 26A to thereby contribute to steering and maneuvering the ship.

Each gate 16, 24 may be preferably sized and configured to substantially seal the thrust chamber 1. A stop 18, 25 may be preferably provided on an inner wall 1D of the thrust chamber 1, the stop 18, 25 being positioned to engage a stern-ward side 16B, 24B of the gate 16, 24 when the gate 16, 24 is pivoted to a closed position, to thereby permit selective closure of the thrust chamber 1 aft the respective gate 16, 24. The gate 16 is configured in this embodiment to the dimensions of the thrust chamber 1, and is shown partially opened to channel water propelled by the propellers 15 to force the water through one or more manifolds or outlet ports 17A situated vertically through the outer side/outer wall 1C of the thrust chamber 1.

As shown in FIG. 3, the manifolds/outlet ports 17A may be closed by a flap valve cover 17 (shown partially open) hinged on the outside of the thrust chamber forward of the outlet port 17A, held over and closing the manifold by springs and water pressure when the gate 16 is closed against the side of the thrust chamber 1, and opening when the gate 16 is opened and water is propelled through the manifold/outlet port 17A. In a preferred embodiment shown in FIGS. 3–4, a flap valve cover 17, 26 is provided. The flap valve cover 17, 26 is sized and configured to close the flap valve cover's 17, 26 respective outlet port 17A, 26A. The flap valve cover 17, 26 is hinged to an outside surface of the outer wall 1C fore and adjacent the outlet port 17A, 26A. A spring means 17B, 26B is provided, the spring means 17B, 26B being positioned to close the flap valve cover against the outlet port when the gate 16, 24 is pivoted to the closed position. The spring means 17B, 26B permits the outlet port 17A, 26A to open when the gate 16,24 is pivoted to channel propelled water through the outlet port 17A, 26A. In this configuration there is also a lip or stop 18 installed on the inner sides of the thrust chamber 1 against which the gate 16 may be closed. If closure of the thrust chamber 1 by a large gate 16 is not necessary for a particular ship, a smaller gate 16 or other mechanical closure of the manifolds may be incorporated.

A bar grating 19 may preferably be lowered within the forward part of the thrust chamber 1 from a watertight compartment 40 above the thrust chamber 1, such as when the ship 100 may encounter logs or other large objects (e.g., when the ship 100 is maneuvered in a river port without cargo or ballast, exposing the thrust bows to floating logs etc.), and selectively lifted up into the compartment 40 to reduce water resistence. In a preferred embodiment, a grating 19 is positioned forward of the bow propulsion means 15. The grating 19 provides a water permeable barrier for preventing logs and other water-borne debris from passing through the thrust chamber 1. The grating 19 is preferably removable or retractable by an electrical or hydraulic motor, e.g. 29 in FIG. 5. Logs or other objects may be removed through a side hull flap 20 and manifold/outlet port 20A (shown partially open), and/or by reversal of the propeller. If beneficial, a removable sealing gate (not shown) may be incorporated forward of the bar grating 19, which may be lowered from a water tight compartment in the upper hull to be supported by and against the bar grating 19 to permit evacuation of water in the thrust chamber when aft gate 16 is closed for inspection, maintenance and repair of a propeller or turbine thruster.

FIG. 4 is a top view of a propulsion unit in the stern section of a starboard thrust chamber 1, comprising a vertical shaft 21, support strut and gear, box 22, single propeller 23, gate 24 (shown partially open), lip or stop 25 for closure of the gate 24, and flap valve cover 26 (shown partially open), in the stern section of the starboard thrust chamber 1. In this embodiment the gate 24, manifold/outlet port 26A and flap valve cover 26 are shown situated to the rear of the propeller 23, which could be installed forward of the propeller 23 if preferred. Also in this view, a rudder gate 27 (shown partially in the stern thrust chamber) is installed in the starboard stern thrust chamber 1, hinged 28 adjacent the stern end 1B and turned by an electric or hydraulic motor 34 (FIG. 5) to vary the thrust of the water exiting the stern, for the purpose of optimizing the thrust under particular circumstances and further assisting in steering and maneuvering the ship 100. In this embodiment and in FIG. 3, there are single propellers 15, 23 in each propulsion unit, which may be modified, as shown in FIG. 7, to install dual propellers 130, 131, one forward and one aft of the shaft 132 and gear box, on the propulsion units, which could increase thrust of and modify the flow of propelled water.

Figure 5:
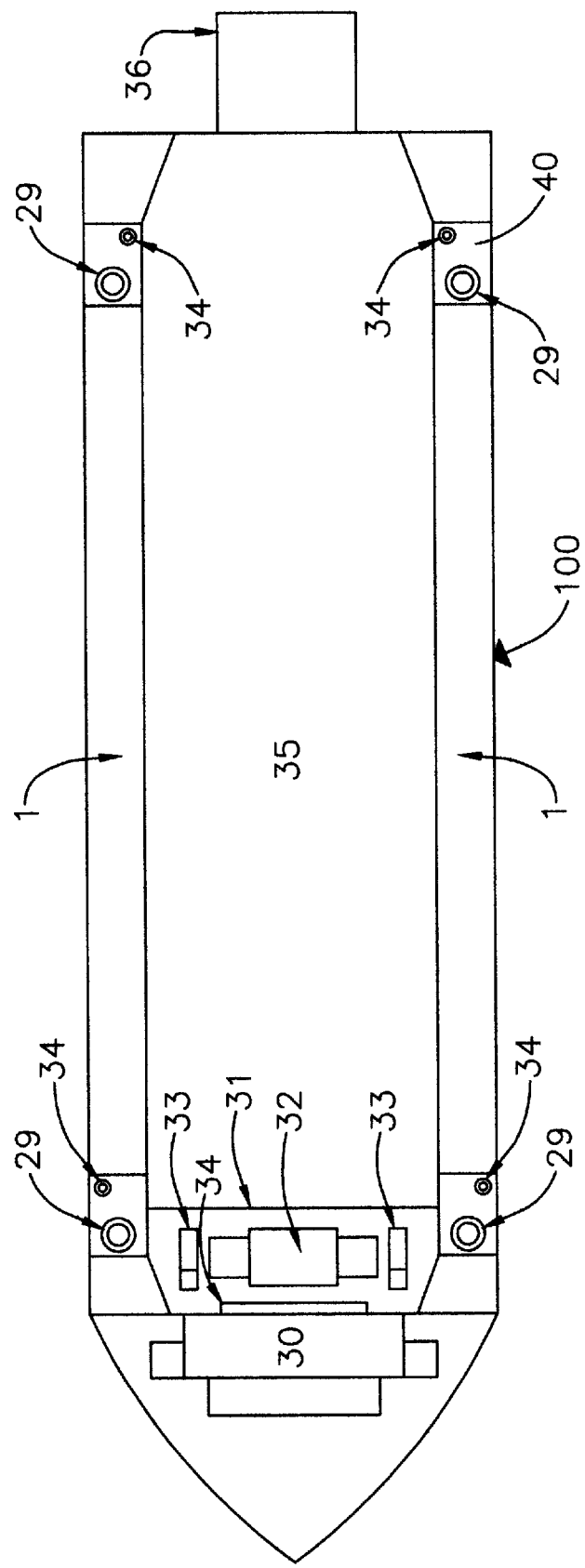
FIG. 5 is a partial cross-sectional top view of one embodiment of a cargo ship according to the invention, showing details and equipment.

FIG. 5 is a top view of a ship 100 with the midships and stern decks removed to show the thrust chambers 1 with electrical motors 29 situated in water tight compartments over the shafts 13, 21 and propellers 15, 23, the forward superstructure 30 for navigation of the ship 100, electronic, electrical and other equipment and controls, crew quarters and other facilities (not shown), together with an engine and control compartment 31 aft of the superstructure 30, containing in this embodiment a large electrical generating unit 32 and axillary electrical generating units 33. From control panels 34 in the compartment 31, electricity would be transmitted to power the propulsion motors 29, gate motors 34, and other motors by means of transmission wires in conduits (not shown). As stated before, one or more additional propulsion units may be installed in the midship sections of the thrust chambers 1, as shown in FIG. 7, depending on the design and intended use of a particular ship.

Also shown in FIG. 5 is a preferred embodiment in which a bottom deck 35 is situated over beams fixed to and connecting the thrust chambers 1, which are also covered by bottom plates (not shown), forming a continuous double bottom hull from bow to stern. Also shown on the stern is a large ramp 36 similar to ramps on conventional "roll on-roll" off ships, for the purpose of loading and unloading cargoes on pallets or in containers, track trailers and rail cars, through the stern of a ship, which may be enhanced due to the wider beam of the depicted ship.

Although the present invention has been described in terms of specific embodiments, it is anticipated that alterations and modifications thereof will no doubt become apparent to those skilled in the art. It is therefore intended that the following claims be interpreted as covering all such alterations and modifications that fall within the true spirit and scope of the invention.

What is claimed is:

1. A propulsion and steering system for reducing water mounding along and under a bow and hull of a mono-hull ship thereby enhancing displacement of water by the hull and permitting increase of the beam to length ratio of the ship comprising:

two or more thrust chambers, each of said thrust chambers passing lengthwise through said hull below a waterline of said ship, each of said thrust chambers having an open bow end and an open stern end;

said bow of said ship configured to channel water into said bow ends of said thrust chambers, said bow configuration including, on either side of a central line of said hull, a substantially rectangular plate depending downward below said waterline, a lower end of said rectangular plate positioned substantially above a bow end of one of said thrust chambers;

a substantially triangular plate depending downward below said waterline, an edge of said triangular plate positioned substantially along said waterline, a second edge of said triangular plate contiguous with a keel-ward edge of said rectangular plate; and a keel plate, said keel plate contiguous with (a) said central line of said hull, (b) a third edge of said triangular plate, and (c) a keel-ward edge of said thrust chamber;

said rectangular plate, said triangular plate, and said keel plate together angled to direct water from said bow into said bow end of said thrust chamber.

2. The apparatus of claim 1, wherein said plates are substantially flat.

3. The apparatus of claim 1, wherein said plates are curved to channel water into said bow end of said thrust chamber.

4. The apparatus of claim 1, further comprising at least one propulsion means positioned in each of said thrust chambers for propelling water through said thrust chamber.

5. The apparatus of claim 4, further comprising each of said thrust chambers having one or more outlet ports passing through an outer wall thereof, said outlet ports positioned aft and adjacent said propulsion means, a gate pivotally secured in said thrust chamber aft and adjacent said outlet ports, and means for pivoting said gate to thereby permit selective channeling of propelled water through said outlet ports to thereby contribute to steering and maneuvering said ship.

6. The apparatus of claim 5, wherein said gate is sized and configured to substantially seal said thrust chamber, and further comprising a stop on an inner wall of said thrust chamber, said stop positioned to engage a stern-ward side of said gate when said gate is pivoted to a closed position, to thereby permit selective closure of said thrust chamber aft said gate.

7. The apparatus of claim 6, further comprising a grating forward of said propulsion means, said grating providing a water permeable barrier for preventing logs and other waterborne debris from passing through said thrust chamber.

8. The apparatus of claim 7, wherein said grating is removable by a means for selectively raising said gate out of said thrust chamber to thereby reduce water resistance.

9. The apparatus of claim 5, further comprising a flap valve cover sized and configured to close said outlet port, said flap valve cover hinged to an outside surface of said outer wall fore and adjacent said outlet port, and a spring means, said spring means positioned to close said flap valve cover against said outlet port when said gate is pivoted to a said closed position, said spring means further permitting said outlet port to open when said gate is pivoted to channel propelled water through said outlet port.

10. The apparatus of claim 4, wherein said propulsion means is positioned adjacent said bow end of said thrust chamber, and further comprising a second propulsion means positioned adjacent a stern end of said thrust chamber.

11. The apparatus of claim 10, further comprising at least one propulsion means positioned in said thrust chamber between said bow propulsion means and said stern propulsion means.

12. The apparatus of claim 4, wherein said propulsion means comprises a water-tight compartment positioned above said thrust chamber, an electric or hydraulic motor positioned in said water-tight compartment, a drive shaft of said motor extending downward into said thrust chamber, and a propeller or turbine thruster rotatably mounted on a lower end of said drive shaft to thereby propel water through said thrust chamber.

13. The apparatus of claim 12, further comprising a second propeller or turbine thruster rotatably mounted on said lower end of said drive shaft to thereby assist said first propeller or turbine thruster in propelling water through said thrust chamber.

14. The apparatus of claim 12, wherein said propulsion means may be selectively reversed to assist in maneuvering and steering said ship.

15. The apparatus of claim 1, further comprising a rudder gate situated vertically at said stern end of said thrust chamber, said rudder gate being selectively rotatable to enhance and direct the flow of propelled water.

16. A propulsion and steering system for reducing water mounding along and under a bow and hull of a mono-hull ship thereby enhancing displacement of water by the hull and permitting increase of the beam to length ratio of the ship comprising:

two or more thrust chambers, each of said thrust chambers passing lengthwise through said hull below a waterline of said ship, each of said thrust chambers having an open bow end and an open stern end, said bow of said ship configured to channel water into said bow ends of said thrust chambers, at least one propulsion means positioned in each of said thrust chambers for propelling water through said thrust chamber, each of said thrust chambers having one or more outlet ports passing through an outer wall thereof, said outlet ports positioned aft and adjacent said propulsion means, a gate pivotally secured in said thrust chamber aft and adjacent said outlet ports, and means for pivoting said gate to thereby permit selective channeling of propelled water through said outlet ports to thereby contribute to steering and maneuvering said ship, said gate sized and configured to substantially seal said thrust chamber, and further comprising a stop on an inner wall of said thrust chamber, said stop positioned to engage a stern-ward side of said gate when said gate is pivoted to a closed position, to thereby permit selective closure of said thrust chamber aft said gate, and a grating forward of said propulsion means, said grating providing a water permeable barrier for preventing logs and other water-borne debris from passing through said thrust chamber, wherein said grating is removable by a means for selectively raising said gate out of said thrust chamber to thereby reduce water resistance.

17. A propulsion and steering system for reducing water mounding along and under a bow and hull of a mono-hull ship thereby enhancing displacement of water by the hull and permitting increase of the beam to length ratio of the ship comprising:

two or more thrust chambers, each of said thrust chambers passing lengthwise through said hull below a waterline of said ship, each of said thrust chambers having an open bow end and an open stern end, said bow of said ship configured to channel water into said bow ends of said thrust chambers, at least one propulsion means positioned in each of said thrust chambers for propelling water through said thrust chamber, each of said thrust chambers having one or more outlet ports passing through an outer wall thereof, said outlet ports positioned aft and adjacent said propulsion means, a gate pivotally secured in said thrust chamber aft and adjacent said outlet ports, and means for pivoting said gate to thereby permit selective channeling of propelled water through said outlet ports to thereby contribute to steering and maneuvering said ship, and a flap valve cover sized and configured to close said outlet port, said flap valve cover hinged to an outside surface of said outer wall fore and adjacent said outlet port, and a spring means, said spring means positioned to close said flap valve cover against said outlet port when said gate is pivoted to a said closed position, said spring means further permitting said outlet port to open when said gate is pivoted to channel propelled water through said outlet port.

\* \* \* \* \*